US010104691B2

(12) United States Patent
Li et al.

(10) Patent No.: US 10,104,691 B2
(45) Date of Patent: Oct. 16, 2018

(54) METHODS OF LISTEN-BEFORE-TALK MECHANISM FOR OPPORTUNISTIC SPECTRUM ACCESS

(71) Applicant: MEDIATEK INC., Hsinchu (TW)

(72) Inventors: Chien-Chang Li, Penghu County (TW); Pei-Kai Liao, Nantou County (TW); Weidong Yang, San Diego, CA (US); Bo-Si Chen, Keelung (TW)

(73) Assignee: MEDIATEK INC., Hsinchu (TW)

( * ) Notice: Subject to any disclaimer, the term of this patent is extended or adjusted under 35 U.S.C. 154(b) by 164 days.

(21) Appl. No.: 15/098,431

(22) Filed: Apr. 14, 2016

(65) Prior Publication Data

US 2016/0309512 A1    Oct. 20, 2016

Related U.S. Application Data

(60) Provisional application No. 62/147,833, filed on Apr. 15, 2015, provisional application No. 62/205,791, filed on Aug. 17, 2015.

(51) Int. Cl.
*H04Q 7/00* (2006.01)
*H04W 74/08* (2009.01)

(52) U.S. Cl.
CPC .............................. *H04W 74/0816* (2013.01)

(58) Field of Classification Search
CPC .................................................. H04W 74/0816
USPC .................................................. 370/329, 330
See application file for complete search history.

(56) References Cited

U.S. PATENT DOCUMENTS

| 9,313,749 | B2* | 4/2016 | Sakata | H04W 52/243 |
| 9,420,549 | B2* | 8/2016 | Sakata | H04W 52/243 |
| 9,451,559 | B2* | 9/2016 | Sakata | H04W 52/243 |
| 9,456,379 | B2* | 9/2016 | Sakata | H04W 28/0284 |
| 2004/0093421 | A1 | 5/2004 | Peng et al. | 709/232 |
| 2007/0263654 | A1 | 11/2007 | Salokannel et al. | 370/448 |

(Continued)

FOREIGN PATENT DOCUMENTS

| CN | 103945558 A | 3/2014 |
| EP | 2413649 A1 | 7/2010 |

OTHER PUBLICATIONS

International Search Report and Written Opinion of International Search Authority for PCT/CN2016/079471 dated Jul. 4, 2016 (11 pages).

(Continued)

*Primary Examiner* — Chuong T Ho
(74) *Attorney, Agent, or Firm* — Oblon, McClelland, Maier & Neustadt, L.L.P.

(57) ABSTRACT

A method of determining and adapting a contention window size (CWS) based on channel loading for load-based equipment (LBE) listen before talk (LBT) channel access mechanism is proposed. The historic observations obtained from carrier sensing can reflect the state of channel loading, which is then used to adapt the maximal contention window size. A wireless device collects historical channel loading information including the number of idle slots and the number of busy slots. The wireless device uses the historical information to estimate the total number of active devices M in the wireless network and the channel-loading factor. The wireless device then computes the thresholds using the long-term value of M and then adapts the value of the CWS based on the channel-loading factor and the thresholds.

16 Claims, 7 Drawing Sheets

(56) References Cited

U.S. PATENT DOCUMENTS

| | | | |
|---|---|---|---|
| 2013/0142180 A1 | 6/2013 | Gidlund et al. | 370/337 |
| 2013/0190025 A1* | 7/2013 | Sakata | H04W 52/243 |
| | | | 455/501 |
| 2015/0036487 A1* | 2/2015 | Sakata | H04W 28/0284 |
| | | | 370/229 |
| 2015/0055541 A1 | 2/2015 | Zhang et al. | 370/312 |
| 2015/0092758 A1 | 4/2015 | Chen et al. | 370/336 |
| 2015/0319713 A1* | 11/2015 | Sakata | H04W 52/243 |
| | | | 455/522 |
| 2015/0319714 A1* | 11/2015 | Sakata | H04W 52/243 |
| | | | 455/522 |
| 2015/0334744 A1* | 11/2015 | Ji | H04W 74/0816 |
| | | | 370/336 |
| 2015/0365830 A1 | 12/2015 | Wei et al. | |
| 2016/0127098 A1* | 5/2016 | Ng | H04L 5/0048 |
| | | | 370/329 |
| 2016/0234835 A1* | 8/2016 | Yerramalli | H04L 1/0009 |
| 2017/0188323 A1 | 1/2017 | Bhushan et al. | |
| 2017/0288823 A1 | 10/2017 | Bhushan et al. | |

OTHER PUBLICATIONS

International Search Report and Written Opinion of International Search Authority for PCT/CN2016/079493 dated Jul. 12, 2016 (11 pages).

* cited by examiner

SYNCHRONOUS NETWORK

ASYNCHRONOUS NETWORK

MAXIMUM CCA ACROSS TWO FBE FRAMES

METHODS OF LISTEN-BEFORE-TALK MECHANISM FOR OPPORTUNISTIC SPECTRUM ACCESS

CROSS REFERENCE TO RELATED APPLICATIONS

This application claims priority under 35 U.S.C. § 119 from U.S. Provisional Application No. 62/147,833 entitled, "Methods of Listen-Before-Talk Mechanism for Opportunistic Spectrum Access" filed on Apr. 15, 2015; U.S. Provisional Application No. 62/205,791 entitled, "Triggering Mechanism for Opportunistic Spectrum Access" filed on Aug. 17, 2015, the subject matter of which is incorporated herein by reference.

TECHNICAL FIELD

The disclosed embodiments relate generally to wireless communication, and, more particularly, to opportunistic spectrum access in Licensed-Assisted-Access (LAA) systems.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand.

One suggested solution is to use a combination of licensed spectrum and unlicensed spectrum. This solution is referred to as "Licensed Assisted Access" or "LAA". In such a solution, an established communication protocol such as Long Term Evolution (LTE) can be used over the licensed spectrum to provide a first communication link, and LTE can be used over the unlicensed spectrum to provide a second communication link. In LTE Release 13, LAA has been approved to enable LTE usage over unlicensed spectrum for small cells. To facilitate efficient and fair spectrum sharing, a dynamic spectrum sharing mechanism called listen-before-talk (LBT) may need to be supported based on regulation rules in each country.

Two kinds of LBT mechanisms, which are frame based equipment (FBE) and load based equipment (LBE), are proposed for spectrum sharing. For FBE, if the network is synchronized, the start timing of clear channel assessment (CCA) is the same between neighboring base stations (eNBs) and user equipments (UEs). Thus, the eNBs/UEs may not detect each other's transmission and lead to collision between the eNBs/UEs. To avoid collision, the randomness between the CCA starting time and transmission starting time is proposed. However, for synchronous network, the randomness still results in a high collision probability if the channel loading is high. On the other hand, for asynchronous network, the starting time of CCA is different between neighboring eNBs/UEs. As a result, the eNBs/UEs with late CCA starting time are always not able to grab the channel. For extended clear channel assessment (ECCA) of LBE mechanism, the original maximal size of contention window is fixed and thus LAA with LBE may be too aggressive to the Wi-Fi access points (APs) or stations (STAs). LBE with a variable size of contention window is proposed but its efficiency may not be good.

Other LBT mechanisms have also been proposed. However, the performance of LAA with LBT mechanism may not satisfy the purpose of efficient and fair spectrum sharing. Consider the scenario of LAA-WiFi coexistence: LAA with FBE may be hard to grab the channel because the starting time and time length of CCA are fixed in a FBE frame; LAA with LBE may be too aggressive to WiFi because WiFi uses the mechanism called exponential backoff. Although LBE uses contention window of a variable size, its efficiency may not be good because the adaption of the size of contention window does not consider historic channel loading information. A solution of LBT mechanism for opportunistic spectrum access is sought.

SUMMARY

In one novel aspect, a method of determining and configuring a maximal clear channel assessment (CCA) duration based on channel loading information for frame-based equipment (FBE) listen before talk (LBT) channel access mechanism is proposed. The CCA period is a random CCA duration generated out of the maximal CCA duration based on channel loading, which is configurable and is carried in the radio resource control (RRC) signaling or the beacon signal of LAA. Furthermore, a method of determining and adapting a contention window size (CWS) based on channel loading for load-based equipment (LBE) LBT channel access mechanism is proposed. The historic observations obtained from carrier sensing can reflect the state of channel loading, which is then used to adapt the maximal contention window size.

In one embodiment, a method of determining a maximal CCA duration based on channel loading information for FBE LBT channel access mechanism is proposed. A wireless device (e.g., eNB/UE) obtains a maximal CCA duration in a wireless communication network. The wireless device adopts a frame-based equipment LBT channel access mechanism. The maximal CCA duration is based on channel loading information. The wireless device determines a random CCA duration for a first FBE frame. The random CCA duration is generated from the maximal CCA duration. The wireless device performs an LBT channel access procedure using the random CCA duration for the first FBE frame. The wireless device transmits radio signals in the first FBE frame after the random CCA duration if the wireless device detects a channel idle condition.

In another embodiment, a method of determining the contention window size based on channel loading for LBE LBT channel access mechanism is proposed. A wireless device determines a channel-loading factor adopting a load-based equipment listen-before-talk mechanism in a wireless communication network. The channel-loading factor is based on a channel idle time sensed by the wireless device. The wireless device determines a contention window size based on the channel-loading factor. The wireless device performs a backoff procedure to access the channel and generates a random backoff counter from the contention window size. The wireless device transmits radio signals if the wireless device detects a channel idle condition for a period defined by the backoff counter.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
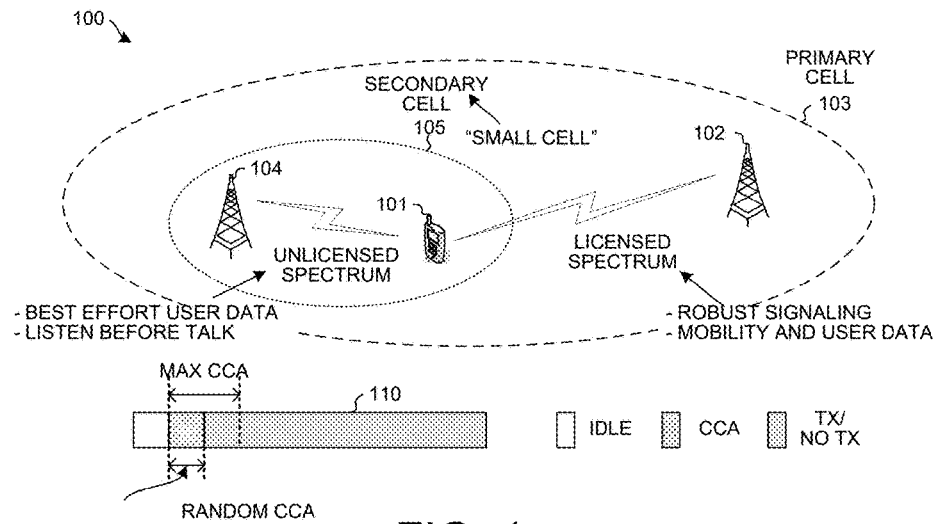
FIG. 1 illustrates an exemplary Licensed Assisted Access (LAA) wireless network that adopts listen before talk (LBT) channel access mechanism in accordance with embodiments of the current invention.

FIG. 1 illustrates an exemplary Licensed Assisted Access (LAA) wireless communications system 100 that adopts listen before talk (LBT) channel access mechanism in accordance with embodiments of the current invention. Wireless communications system 100 includes one or more wireless communication networks, and each of the wireless communication networks has base infrastructure units, such as 102 and 104. The base units may also be referred to as an access point, an access terminal, a base station, eNB, or by other terminology used in the art. Each of the base stations 102 and 104 serves a geographic area. The geographic area served by wireless communications stations 102 and 104 overlaps in this example.

Base station 102 is a licensed base station that communicates with UE 101 via a licensed frequency band. In one example, base station 102 communicates with UE 101 via Long-Term Evolution (LTE) wireless communication. Base station 102 provides wireless communication to multiple UEs within primary cell 103. Base station 104 is an unlicensed base station that communicates with UE 101 via an unlicensed frequency band. In one example, base station 104 communicates with UE 101 via LTE wireless communication. Base station 104 can communicate with multiple UEs with a secondary cell 105. Secondary cell 105 is also referred to as a "small cell".

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. A LAA network utilizes licensed frequency bands in addition to unlicensed frequency bands contemporaneously, thereby provided additional available bandwidth to the UEs in the wireless system. For example, UE 101 can benefit from simultaneous use of the licensed frequency band and the unlicensed frequency band in a LAA network. The LAA network not only provides additional bandwidth for greater overall data communication, but also provide consistent data connectivity due to the presence of two separate data links. Having multiple data links available increases the probability that the UE will be able to achieve proper data communication with at least one base station at any given moment. While utilization of the unlicensed spectrum provides more available bandwidth, the use of the unlicensed spectrum faces practical problems that need to be addressed.

To facilitate efficient and fair spectrum sharing, a dynamic spectrum sharing mechanism called listen-before-talk (LBT) is supported based on regulation rules in each country. Two kinds of LBT mechanisms, which are frame-based equipment (FBE) and load-based equipment (LBE), are proposed for spectrum sharing. Various FBE LBT and LBE LBT mechanisms have been proposed. However, the performance of LAA with LBT mechanism may not satisfy the purpose of efficient and fair spectrum sharing.

In accordance with one novel aspect, a method of determining and configuring a maximal clear channel assessment (CCA) duration based on channel loading information for FBE LBT channel access mechanism is proposed. As illustrated in FIG. 1, a FBE frame 110 starts with an idle period, a CCA period, and is followed by transmission if channel is idle or no transmission if channel is busy. The CCA period is a random CCA duration generated out of the maximal CCA duration, which is configurable and is carried in the radio resource control (RRC) signaling or the beacon signal of LAA. Furthermore, a method of determining and adapting a contention window size (CWS) based on channel loading for LBE LBT channel access mechanism is proposed. The historic observations obtained from carrier sensing can reflect the state of channel loading, which is then used to adapt the maximal contention window size.

Figure 2:
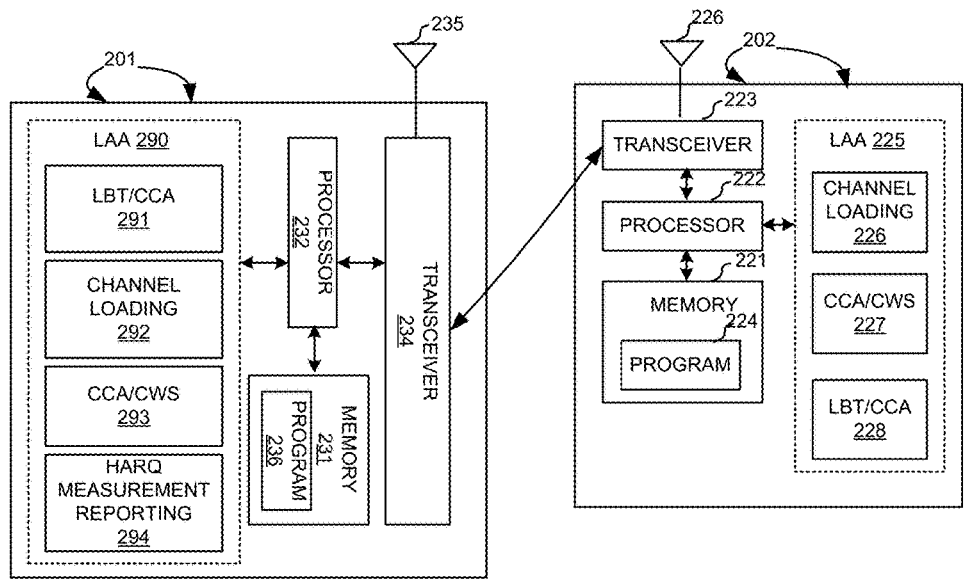
FIG. 2 illustrates an exemplary block diagram of a User Equipment (UE) and a base station (eNB) in accordance with embodiments of the current invention.

FIG. 2 illustrates the various components included in a UE 201 and a base station 202. Base station 202 may have an antenna array 226 with one or more antennas, which transmit and receive radio signals. An RF transceiver module 223, coupled with the antenna, receives RF signals from antenna array 226, converts them to baseband signals and sends them to processor 222. RF transceiver 223 also converts received baseband signals from processor 222, converts them to RF signals, and sends out to antenna array 226. Processor 222 processes the received baseband signals and invokes different functional modules to perform features in base station 202. Memory 221 stores program instructions and data 224 to control the operations of base station 202. Base station 202 also includes a set of control modules, LAA controller 225 that carries out functional tasks to configure, schedule, execute and communicate with the UE 201 for LAA tasks such as described in detail below. In one example, LAA controller 225 includes a channel-loading calculator 226 that estimates channel loading information via eNB sensing or via HARQ ACK/NACK feedback, a CCA/CWS handler 227 that obtains the maximal CCA duration and generates the random CCA for FBE, as well as adapts the contention window size based on channel-loading for LBE, and a LBT/CCA channel access handler 228 that ensures BS 202 only transmits radio signals over the shared medium when the channel is idle or when it wins the channel contention via CCA/ECCA channel access procedure.

User equipment UE 201 has an antenna array 235 with one or more antennas, which transmit and receive radio signals. An RF transceiver module 234, coupled with the antenna, receives RF signals from antenna array 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in UE 201. Memory 231 stores program instructions and data 236 to control the operations of UE 201.

UE 201 also includes a set of control modules and circuits including LLA controller 290 that carry out functional tasks. The control modules and circuits can be implemented and configured by hardware, firmware, software, and a combination thereof. LBT/CCA channel access handler 291 ensures that UE 201 does not transmit signals when another unlicensed frequency band eNB/UE is transmitting. Channel loading calculator 292 estimates channel-loading information from historical info. CCA/CWS handler 293 obtains the maximal CCA duration and generates the random CCA for FBE, as well as adapts the contention window size for LBE. Measurement and reporting circuit 294 performs Hybrid Automatic Repeat Request (HARQ) and CSI/RRM measurements and reports the HARQ feedback and measurement results to its serving base station.

The listen-before-talk mechanism for radio signal transmission can be based on the scheme for frame-based-equipment (FBE). One example scheme for FBE is to have a minimum clear channel assessment (CCA) sensing period (e.g., >=20 us) at the beginning or at the end of each subframe. As soon as the channel is obtained, eNB/UE transmits a burst of radio signals over integer subframes continuously. The listen-before-talk mechanism for radio signal transmission can be based on the scheme for load-based-equipment (LBE) as well. As soon as the channel is obtained, e.g., via CCA/ECCA channel access procedure, eNB/UE may transmit punctured radio signals within a fractional subframe for channel reservation first and then transmit a burst of radio signals over integer subframes continuously.

Figure 3:
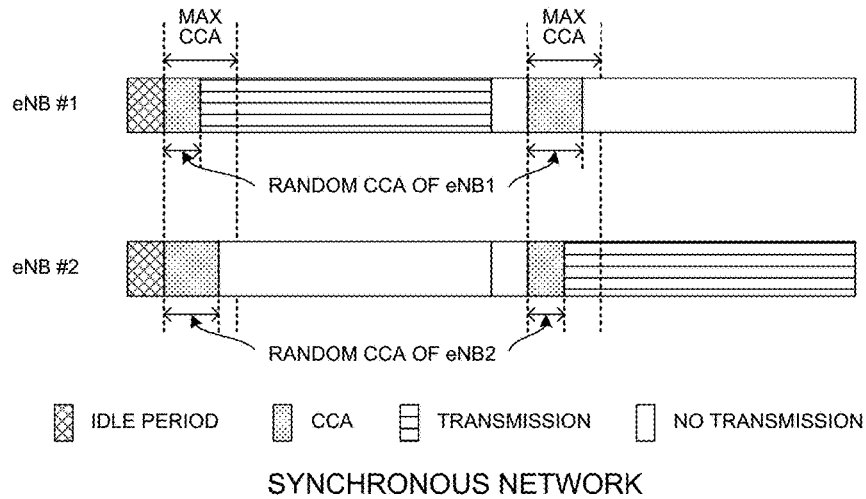
FIG. 3 illustrates an exemplary diagram of maximal clear channel assessment (CCA) duration and random CCA duration for frame-based equipment (FBE) in a synchronous wireless network in accordance with embodiments of the current invention.

FIG. 3 illustrates an exemplary diagram of maximal clear channel assessment (CCA) duration and random CCA duration for frame-based equipment (FBE) in a synchronous wireless network in accordance with embodiments of the current invention. For the synchronous network, the randomness between the CCA starting time and transmission starting time is introduced to avoid collision. As depicted in FIG. 3, when the random CCA of eNB1 is shorter than the random CCA of eNB2, then eNB1 grabs the channel and transmits data. Similarly, when the random CCA of eNB1 is longer than the random CCA of eNB2, then eNB2 grabs the channel and transmits data. However, the randomness of CCA introduced fails to solve the collision problem when the channel loading is high. The reason is that if the maximal CCA duration is fixed, then the probability that two or more eNBs use the same size of random CCA increases if the channel loading is high. For example, suppose the maximal duration of CCA is 30 µs and the random CCA uniformly ranges drawn from the set {21 µs, 22 µs . . . 30 µs}. Assume the traffic is full buffer. The probability of two eNBs choosing the same random CCA is 0.01. The probability of five eNBs choosing the same random CCA becomes 0.7.

Figure 4:
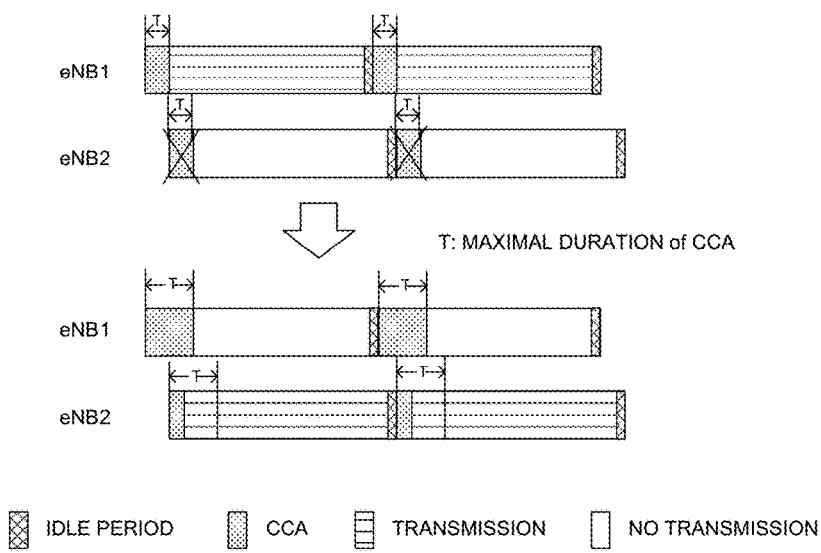
FIG. 4 illustrates an exemplary diagram of maximal CCA duration for frame-based equipment (FBE) in an asynchronous wireless network in accordance with embodiments of the current invention.

FIG. 4 illustrates an exemplary diagram of maximal CCA duration for frame-based equipment (FBE) in an asynchronous wireless network in accordance with embodiments of the current invention. For asynchronous network, fixed size of the maximal CCA duration also results in the unfairness problem. For example, suppose the maximal duration of CCA is 30 µs. If the difference of the CCA starting time between two eNBs is greater than 30 µs, then the eNB with late CCA timing will never be able to grab the channel. As depicted in the top diagram of FIG. 4, the CCA duration of eNB1 and eNB2 is T. Because eNB1 and eNB2 are not synchronous, eNB1 will sense the channel first and transmit data first. If the difference of the CCA starting time between eNB1 and eNB2 is greater than T, then eNB2 will never grab the channel to transmit its data. It is unfair to eNB2.

In accordance with one novel aspect, it is proposed that the maximal duration of CCA (which is the maximal size of the random CAA) should be adaptive based on the experienced channel occupancy status, the experienced synchronization difference within the network or both. More specifically, to solve the collision problem in synchronous network and the unfairness problem in asynchronous network, the maximal duration of CCA should be variable. The best choice of maximal CCA duration depends on the channel loading and the timing difference between eNBs/UEs. First, the maximal duration of CCA should be adjusted according to the channel loading. Second, the maximal duration of CCA should be larger than the timing difference between eNBs or between UEs. Since the network can obtain the information of channel loading and timing of eNBs/UEs, the network can inform eNBs/UEs the maximal duration of CCA by CCA configurations carried in the radio resource control (RRC) signaling or carried in the beacon signal of LAA.

Referring back to FIG. 3, the maximal duration of CCA (which is the maximal size of the random CAA) for eNB1 and eNB2 is adaptive based on the experienced channel occupancy status. The network (eNB1 and eNB2) can obtain the information of channel loading and determine the maximal duration of CCA accordingly. The channel loading information may contain ACK/NACKs feedback from UEs, channel state information (CSI) report from UEs, and radio resource management (RRM) measurement results from UEs. If the channel loading is high, then maximal CCA duration is configured to be longer. As a result, the probability of collision is decreased and it is fairer to all eNBs and UEs in the network.

Referring back to FIG. 4, as depicted in the bottom diagram of FIG. 4, the maximal CCA duration is T, which is longer than the timing difference between eNB1 and eNB2. In addition, the CCA duration used for eNB1 and eNB2 are randomly generated from 0~T. In this example, the CCA duration used for eNB2 is shorter than eNB1. As a result, although eNB1 starts CCS earlier, eNB2 can still grab the channel and transmits data.

Figure 5:
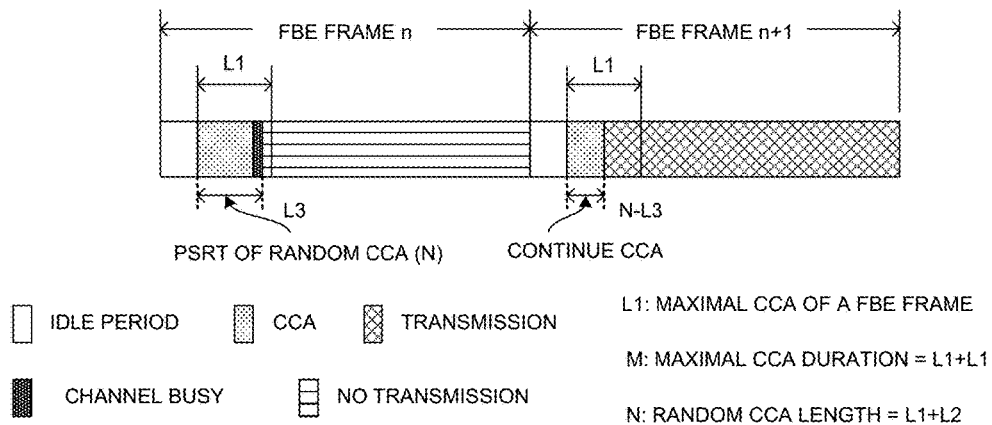
FIG. 5 illustrates an example of maximal CCA duration across two FBE frames in accordance with embodiments of the current invention.

FIG. 5 illustrates an example of maximal CCA duration across two FBE frames in accordance with embodiments of the current invention. In the examples of FIG. 3 and FIG. 4, the random CCA for LBT is completed in a single FBE frame, which is a radio frame or subframe. To further improve the efficiency and flexibility in FBE, the maximal duration of CCA can be larger than the maximal CCA duration of a FBE frame and extended across more than one FBE frame. This means that the random CCA can be performed across several FBE frames. In the example of FIG. 5, the maximal duration of CCA is extended across from FBE frame n to FBE frame (n+1). Let L1 be the maximal CCA duration of FBE frame n and L1 also be the maximal CCA duration of FBE frame (n+1). In this example, the maximal duration of CCA (M) is equal to (L1+L1) and hence the length of random CCA (N) may be larger than L1. This is because the random CCA length N is randomly drawn from the maximal CCA duration M. Therefore, if M>L1, then it is possible that N>L1. For example, the CCA duration in the first FBE frame n is L1, and the CCA duration in the second FBE frame n+1 is L2 (e.g., N=L1+L2). As a result, the random CCA will be performed across two FBE frames n and n+1. When the eNB or the UE senses that the channel is busy in FBE frame n using CCA length L1, it does not transmit. Suppose that a duration of L3 has been sensed to have channel idle condition in FBE frame n. The eNB/UE then continues CCA in FBE frame (n+1) using CCA length of (N-L3). Note that CCA can be performed across more than two FBE frames (e.g., three FBE frames). For example, the maximal CCA duration M=3*(L1) and the random CCA duration N=2*(L1)+L2.

Figure 6:
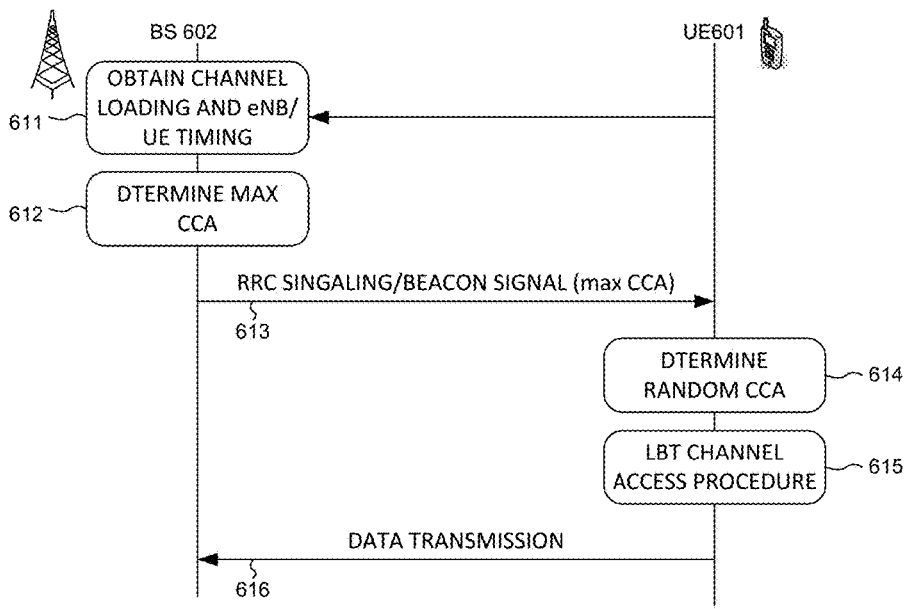
FIG. 6 illustrates a process of LBT mechanism with determining the maximal CCA duration based on channel loading information in accordance with embodiments of the current invention.

FIG. 6 illustrates a process of LBT mechanism with determining the maximal CCA duration based on channel loading information in accordance with embodiments of the current invention. In step 611, eNB 602 obtains channel loading information and timing information between eNB and UE. For example, the channel loading information may contain ACK/NACKs feedback from UEs, channel state information (CSI) report from UEs, and radio resource management (RRM) measurement results from UEs. In step 612, eNB 602 determines the maximal CCA duration for the network based on the channel loading information and timing information. For example, a higher maximal CCA duration is determined if the channel loading is high. In addition, the maximal CCA duration needs to be longer than the timing difference between the eNB and the UE. In step 613, eNB 602 inform UE 601 the maximal CCA duration by CCA configurations carried in the RRC signaling or carried in the beacon signal of LAA. In step 614, UE 602 draws the random CCA length from the maximal CCA. In step 615, UE 601 performs FBE LBT channel access procedure using the random CCA length. In step 616, UE 601 transmits data if it grabs the channel successfully.

Figure 7:
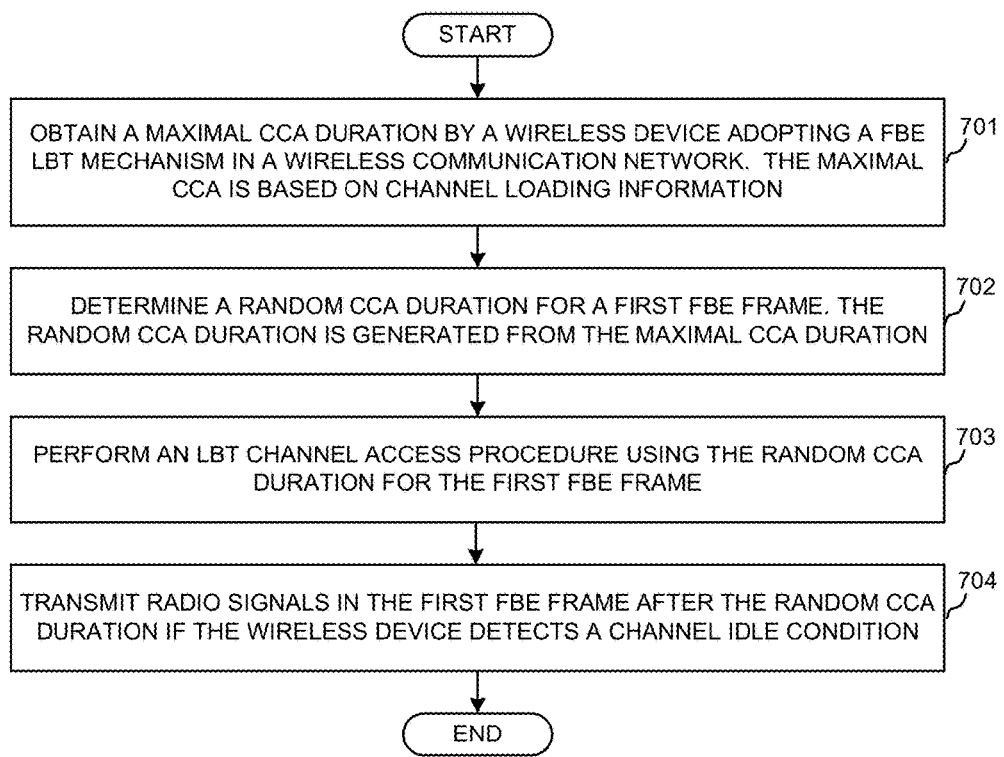
FIG. 7 is a flow chart of a method of determining the maximal CCA duration based on channel loading information for FBE LBT channel access mechanism in accordance with embodiments of the current invention.

FIG. 7 is a flow chart of a method of determining the maximal CCA duration based on channel loading information for FBE LBT channel access mechanism in accordance with embodiments of the current invention. In step 701, a wireless device (e.g., eNB/UE) obtains a maximal CCA duration in a wireless communication network. The wireless device adopts a frame-based equipment LBT channel access mechanism. The maximal CCA duration is based on channel loading information. In step 702, the wireless device determines a random CCA duration for a first FBE frame. The random CCA duration is generated from the maximal CCA duration. In step 703, the wireless device performs an LBT channel access procedure using the random CCA duration for the first FBE frame. In step 704, the wireless device transmits radio signals in the first FBE frame after the random CCA duration if the wireless device detects a channel idle condition. In one example, the maximal CCA duration is longer than a timing difference between a base station and a user equipment in the wireless network. In another example, the maximal CCA duration is obtained from an RRC signaling message or from a beacon signal transmission. In yet another example, the random CCA extends across multiple FBE frames.

Figure 8:
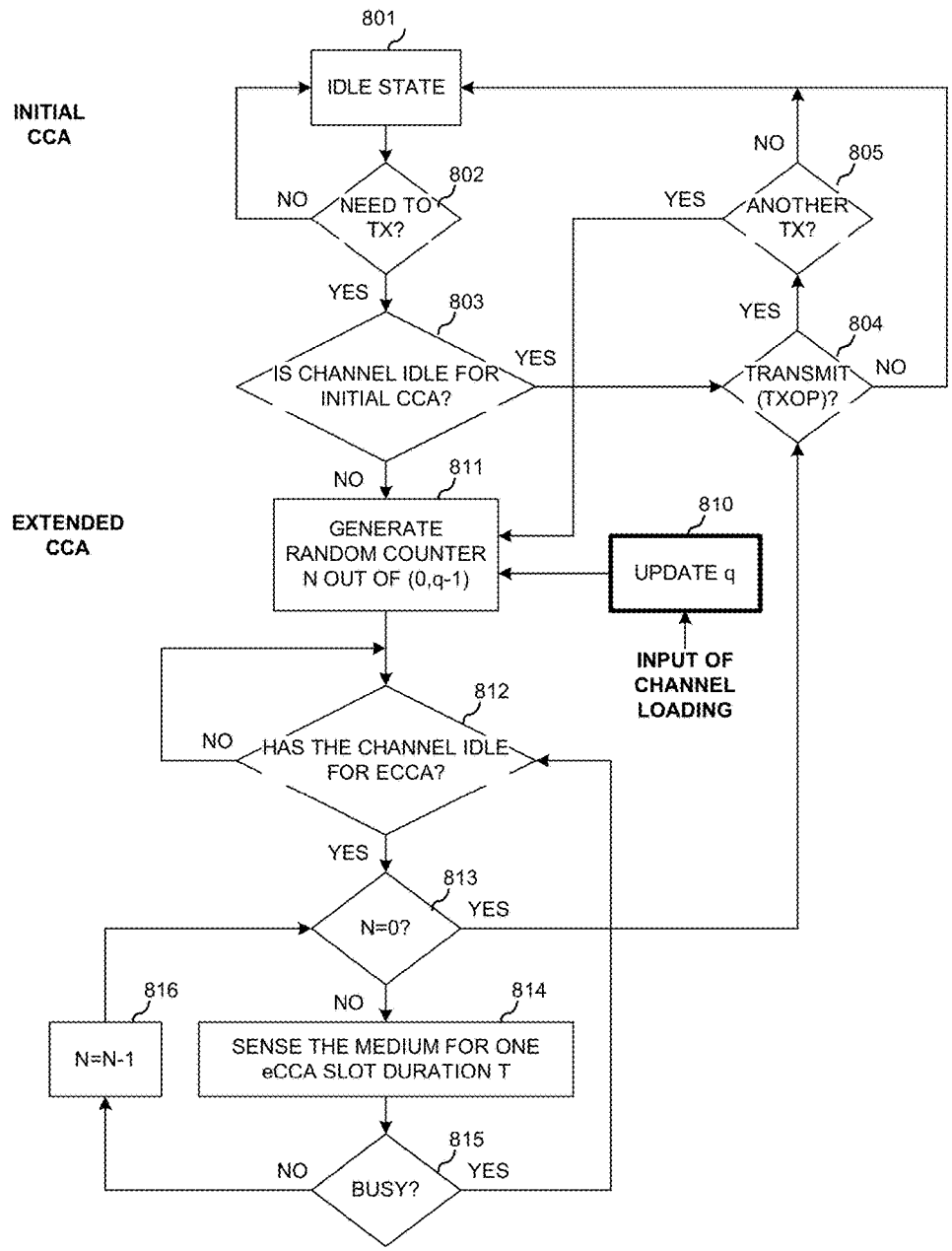
FIG. 8 illustrates a load-based equipment (LBE) LBT channel access mechanism based on initial CCA and extended CCA using adaptive contention window size based on a channel-loading factor in accordance with embodiments of the current invention.

FIG. 8 illustrates a load-based equipment (LBE) LBT channel access mechanism using initial CCA and extended CCA using adaptive contention window size based on a channel-loading factor in accordance with embodiments of the current invention. In step 801, an LBE wireless device (an eNB/UE) is in idle state. In step 802, the eNB/UE determines whether it needs to transmit. If no, it returns to idle state; if yes, it goes to step 803 and checks whether the wireless channel is idle for the initial CCA period ($B_{CCA}$, e.g., 34 us). If the answer is yes, then the eNB/UE transmits radio signals in step 804 and checks if it has obtained the transmit opportunity (TXOP). If the answer is no, then it goes back to idle state; if the answer is yes, then it goes to step 805 and determines whether it needs another transmission. If the answer is no, then it goes back to idle state.

If the answer to step 803 is no, or if the answer to step 805 is yes, then the eNB/UE goes to step 811 and enters the extended CCA procedure. In step 811, the eNB/UE generates a random backoff counter N out of the contention window size q (e.g., N is generated from 0 to q−1). In step 812, the eNB/UE checks whether the wireless channel has been idle for the extended ECCA defer period ($D_{ECCA}$, e.g., 34 us). If the answer is no, then it goes back to step 812; if the answer is yes, then it goes to step 813 and checks whether the random backoff counter N is equal to zero. If the answer is yes, then it goes to step 804 for transmission; if the answer is no, then it goes to step 814 and senses the wireless medium for one ECCA time slot duration T (e.g., T=9 us). In step 815, the eNB/UE checks whether the wireless channel is busy. If the answer is yes, then it goes back to step 812; if the answer is no, then it goes to step 816 and reduces the random backoff counter N by one (e.g., N=N−1), and then goes to step 813 to check whether counter N is equal to zero. Note that based on the ECCA procedure, when the channel is busy, the eNB/UE shall defer transmission until the wireless channel has been determined to be idle for an uninterrupted deferred period.

One important problem in LBE LBT is how to adapt the size of contention window. To improve efficiency of LBT, the idea of considering the historic information in the LBT mechanism has been proposed. However, the metric to determine the channel loading (i.e., how busy the channel has been) and the mechanism to adapt the value of q have not been provided. In accordance with one novel aspect, the best size of the contention window depends on the traffic loading in the network. Thus, the problem becomes how to define a metric that can reflect the channel loading and how to adapt the size of contention window if the metric is found. As depicted by step 810, the contention window size q is dynamically adapted based on the input of historic channel loading.

Figure 9:
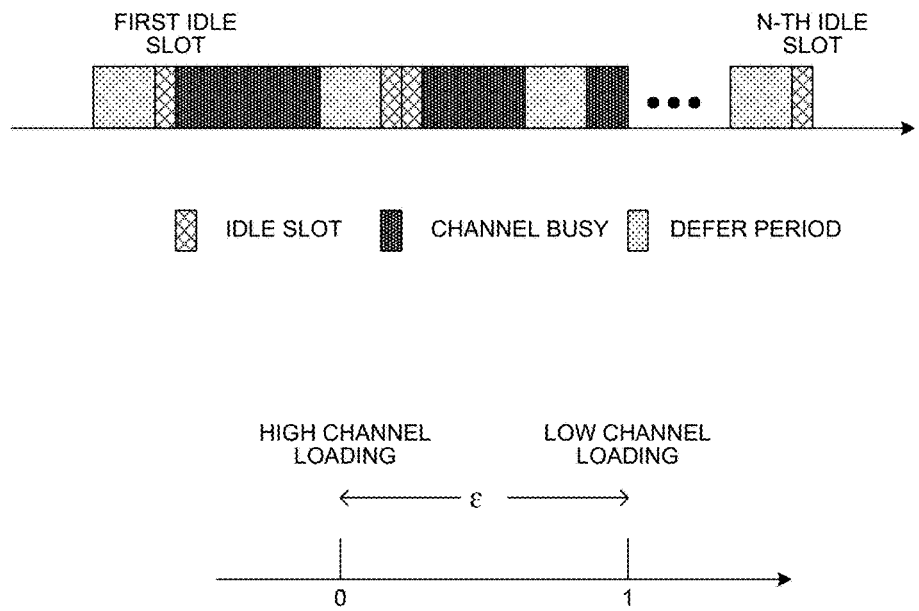
FIG. 9 illustrates a backoff procedure for LBE LBT channel access mechanism and relationship with the channel-loading factor.

FIG. 9 illustrates a backoff procedure for LBE LBT channel access mechanism and relationship with the channel-loading factor. FIG. 9 shows the backoff procedure of LBT category 4, corresponds to LBT with random backoff with variable size of contention window. Define an idle slot as the time interval during which a complete ECCA slot is finished. Suppose N is the number of idle slots, which is uniformly drawn from 1 to q. Then the channel loading factor can be defined as:

$$\varepsilon = \frac{N \times T_{Slot}}{T_{Backoff}}, \quad (1)$$

where $T_{backoff}$ is the total backoff time $T_{Slot}$ is the slot time used in the ECCA procedure Suppose $T_D$ is the length of defer period, $N_D$ is the number of occurrences of defer period, and $T_{Busy}$ is the total busy time in the backoff procedure. Then we have $T_{Backoff} = N \times T_{Slot} + N_D \times T_D + T_{Busy}$. The value of ε can reflect how busy the channel has been and thus can be used as the metric for determining channel loading. For example, ε with a large value means the loading of the channel is low. On the contrary, ε with a small value means the loading of the channel is high. When the channel is never busy in the duration of backoff procedure (i.e., $T_{BUSY}=0$ and $N_D=0$), we have ε=1. When the channel is very busy in the duration of backoff procedure, we have ε→0. As a result, we know ε is bounded by 0<ε≤1. The relation between the metric ε and channel loading is depicted in FIG. 9.

In accordance with one novel aspect, the value of the maximal size of contention window q is based on the information of the previous or historical ECCA procedures. In general, if the channel loading is higher, then the contention window size is adapted to be increasing, and if the channel loading is lower, then the contention window size is adapted to be decreasing. More specifically, the channel-loading factor ε defined in equation (1) can be used to adapt the size of the contention window size q. The adaption can be based on the quantization of the channel-loading factor.

Figure 10:
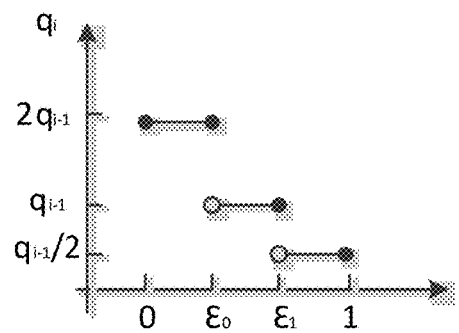
FIG. 10 illustrates an exemplary diagram of determining channel-loading thresholds and adapting the contention window size in accordance with embodiments of the current invention.

FIG. 10 illustrates an exemplary diagram of determining channel-loading thresholds and adapting the contention window size in accordance with embodiments of the current invention. Several methods can be used to adapt the size of contention window using channel-loading factor. Let $\varepsilon_{i-1}$ be the channel loading factor of (i-1)-th backoff procedure. Then the size of the contention window of i-th backoff procedure $q_i$ can be adapted in two alternatives. In a first alternative, the last channel-loading factor $\varepsilon_{i-1}$ is used. In a second alternative, the average of historical channel-loading factor is used. As depicted by FIG. 10, the interval of the channel loading factor is divided into three parts: 0 to $\varepsilon_0$, $\varepsilon_0$ to $\varepsilon_1$, and $\varepsilon_1$ to 1, where $\varepsilon_0$ and $\varepsilon_1$ are the thresholds.

Under the first alternative 1, the contention window size $q_i$ is adapted by:

$$\begin{cases} 2q_{i-1}, & \text{if } 0 \le \varepsilon_{i-1} \le \varepsilon_0, \\ q_{i-1}, & \text{if } \varepsilon_0 < \varepsilon_{i-1} \le \varepsilon_1, \\ \frac{q_{i-1}}{2}, & \text{if } \varepsilon_1 < \varepsilon_{i-1} \le 1, \end{cases}$$

Under the second alternative 2, the contention window size $q_i$ is adapted by:

$$\begin{cases} 2q_{i-1}, & \text{if } 0 \le \varepsilon_{avg,P} \le \varepsilon_0, \\ q_{i-1}, & \text{if } \varepsilon_0 < \varepsilon_{avg,P} \le \varepsilon_1, \\ \frac{q_{i-1}}{2}, & \text{if } \varepsilon_1 < \varepsilon_{avg,P} \le 1, \end{cases}$$

Where

For alternative 2-1, define the average channel loading factor of the past P backoff procedures as $$\varepsilon_{avg,P} = \sum_{m=1}^{P} \frac{\varepsilon_{i-m}}{P}$$

For alternative 2-2, define the average channel loading factor of the past P backoff procedures as $$\varepsilon_{avg,P} = \frac{\sum_{m=1}^{P} N_{i-m} \times T_{Slot}}{\sum_{m=1}^{P} T_{Backoff,i-m}}$$

In the above illustration, the channel-loading factor is reversely proportional to the channel loading based on Equation (1). The low threshold value $\varepsilon_0$ indicates a high channel-loading threshold, while the high threshold value $\varepsilon_1$ indicates a low channel-loading threshold. As a result, if the channel-loading factor is higher than the high threshold value $\varepsilon_1$ (e.g., lower than the low channel-loading threshold), then the value of q is adapted to be decreasing, and if the channel-loading factor is lower than the low threshold value $\varepsilon_0$ (e.g., higher than the high channel-loading threshold), then the value of q is adapted to be increasing. In other alternative embodiments, the channel-loading factor can be proportional to the channel loading, and the same principle of adapting q based on the channel loading applies.

Now the problem is how to determine the thresholds $\varepsilon_0$ and $\varepsilon_1$. Suppose there are M devices that are trying to grab the channel for a given size of contention window q. If the LBT mechanism is fair, each device (eNB or UE) should observe (M-1) busy slots before it gets the channel. In this case, the channel load factor for a given q is approximated by:

$$\varepsilon_{q,opt} \approx \begin{cases} \frac{1}{q}\sum_{k=1}^{q}\frac{k \times T_{Slot}}{k \times T_{Slot} + (M-1) \times (T_D + T_o)}, \\ \quad \text{for Alternatives 1 and 2-1,} \\ \frac{\sum_{k=1}^{q} k \times T_{Slot}}{\sum_{k=1}^{q} k \times T_{Slot} + (M-1) \times (T_D + T_0)}, \text{ for Alternative 2-2,} \end{cases}$$

Where

M is the number of active devices $T_{Slot}$ is the slot time used in the ECCA procedure $T_D$ is the length of defer period $T_o$ is the maximal channel occupancy time If $\varepsilon > K\varepsilon_{q,opt}$, where K is an integer, the eNB or UE may feel the channel loading is low enough and thus q can be halved. Thus we can choose and $\varepsilon_1 = K\varepsilon_{q,opt}$. For example, we can choose K=2 and thus $\varepsilon_1 = 2\varepsilon_{q,opt}$ If $$\varepsilon < \frac{\varepsilon_{q,opt}}{L},$$

where L is an integer, the eNB or UE may feel that there are more than M devices that try to grab the channel. This means the channel loading is high and thus q can be doubled. Thus we can choose and $$\varepsilon_0 = \frac{\varepsilon_{q,opt}}{L}.$$

For example, we can choose L=2 and thus $$\varepsilon_0 = \frac{\varepsilon_{q,opt}}{2}$$

Figure 11:
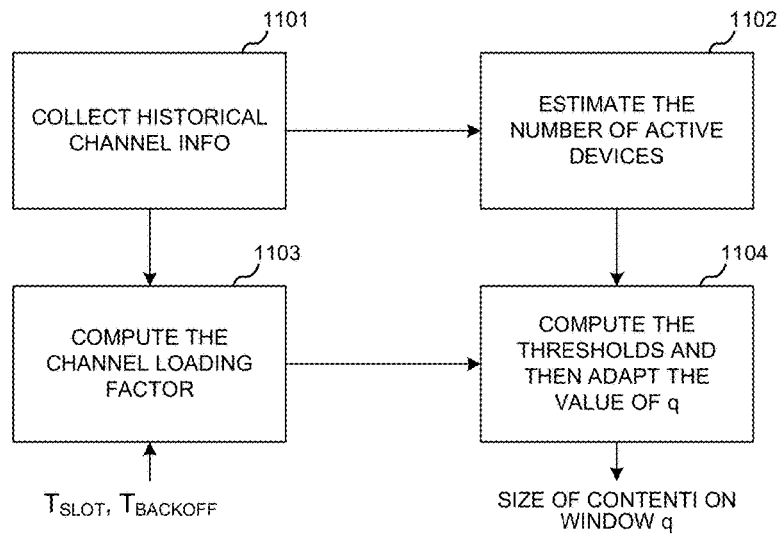
FIG. 11 illustrates a process of adapting the size of contention window based on channel loading in accordance with embodiments of the current invention.

FIG. 11 illustrates a process of adapting the size of contention window based on channel loading in accordance with embodiments of the current invention. In step 1101, a wireless device collects historical channel loading information including the number of idle slots and the number of busy slots. In step 1102, the wireless device uses the historical information to estimate the total number of active devices M in the wireless network, which is a long-term value. In step 1103, the wireless device uses the historical information to compute the channel-loading factor $\varepsilon$, which is a short-term value. In step 1104, the wireless device first computes the thresholds $\varepsilon_0$ and $\varepsilon_1$ using the long-term value of M and then adapts the value of q based on the short-term channel-loading factor $\varepsilon$ and the thresholds.

Figure 12:
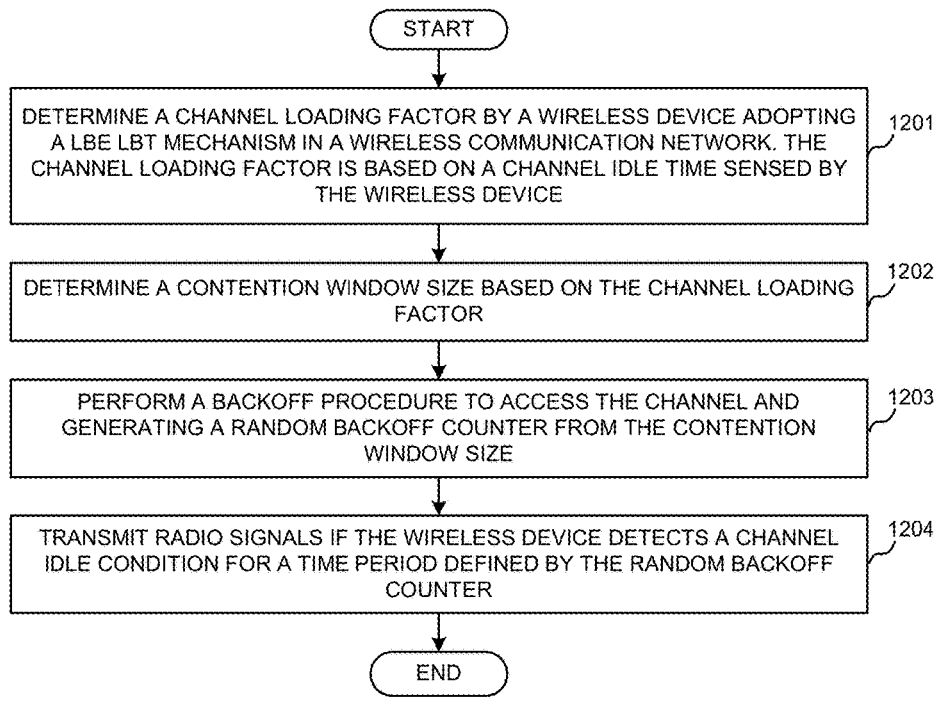
FIG. 12 is a flow chart of a method of determining the contention window size based on channel loading for LBE LBT channel access mechanism in accordance with embodiments of the current invention.

FIG. 12 is a flow chart of a method of determining the contention window size based on channel loading for LBE LBT channel access mechanism in accordance with embodiments of the current invention. In step 1201, a wireless device determines a channel-loading factor adopting a load-based equipment listen-before-talk mechanism in a wireless communication network. The channel-loading factor is based on a channel idle time sensed by the wireless device. In step 1202, the wireless device determines a contention window size based on the channel-loading factor. In step 1203, the wireless device performs a backoff procedure to access the channel and generates a random backoff counter from the contention window size. In step 1204, the wireless device transmits radio signals if the wireless device detects a channel idle condition for a period defined by the backoff counter. In one example, the channel-loading factor is computed based on a previous backoff procedure performed by the wireless device. In another example, the channel-loading factor is an average of channel loading factors computed based on a plurality of historical backoff procedures.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   determining a channel loading factor indicative of a channel loading of a channel by a wireless device adopting a load based equipment (LBE) listen-before-talk (LBT) mechanism in a wireless communication network, wherein the channel loading factor is an average channel loading factor determined based on historical backoff procedures performed by the wireless device;
   determining a contention window size based on the channel loading factor;
   performing another backoff procedure to access the channel based on a random backoff counter value that is determined according to the contention window size; and
   transmitting radio signals using the channel if the wireless device during the another backoff procedure detects a channel idle condition for a period defined by the random backoff counter value.

2. The method of claim 1, wherein the another backoff procedure is an extended clear channel assessment (CCA) channel access procedure.

3. The method of claim 1, wherein the channel-loading factor is computed based on a relationship between historical random backoff counter values and corresponding backoff time values of the historical backoff procedures.

4. The method of claim 1, wherein the contention window size is determined based on a high channel-loading threshold and a low channel-loading threshold.

5. The method of claim 4, wherein the contention window size is increased if the channel loading factor is higher than the high channel-loading threshold.

6. The method of claim 4, wherein the contention window size is decreased if the channel loading factor is lower than the low channel-loading threshold.

7. The method of claim 4, wherein the thresholds are determined based on a total number of active devices in the wireless communication network.

8. The method of claim 7, further comprising estimating, by the wireless device, the total number of active devices in the wireless communication network.

9. A wireless device, comprising:
   a processing circuit configured to:
      determine a channel loading factor indicative of a channel loading of a channel in a wireless communication network, wherein the channel loading factor is an average channel loading factor determined based on historical backoff procedures performed by the wireless device adopting a load based equipment (LBE) listen-before-talk (LBT) mechanism;

determine a contention window size based on the channel loading factor; and perform another backoff procedure to access the channel based on a random backoff counter value that is determined according to the contention window size; and a transmitter configured to transmit radio signals using the channel if the wireless device during the another backoff procedure detects a channel idle condition for a period defined by the random backoff counter value.

10. The wireless device of claim 9, wherein the another backoff procedure is an extended clear channel assessment (CCA) channel access procedure.

11. The wireless device of claim 9, wherein the channel-loading factor is computed based on a relationship between historical random backoff counter values and corresponding backoff time values of the historical backoff procedures.

12. The wireless device of claim 9, wherein the contention window size is determined based on a high channel-loading threshold and a low channel-loading threshold.

13. The wireless device of claim 12, wherein the contention window size is increased if the channel loading factor is higher than the high channel-loading threshold.

14. The wireless device of claim 12, wherein the contention window size is decreased if the channel loading factor is lower than the low channel-loading threshold.

15. The wireless device of claim 12, wherein the thresholds are determined based on a total number of active devices in the wireless communication network.

16. The wireless device of claim 15, wherein the wireless device is further configured to estimate the total number of active devices in the wireless communication network.

* * * * *